United States Patent
Hagen et al.

(10) Patent No.: US 9,587,915 B2
(45) Date of Patent: Mar. 7, 2017

(54) AIRBORNE LASER WEAPON SYSTEM

(71) Applicant: MBDA Deutschland GmbH, Schrobenhausen (DE)

(72) Inventors: Thomas Hagen, Rohrbach/Ilm (DE); Franz Geidek, Aresing (DE)

(73) Assignee: MBDA Deutschland GmbH, Schrobenhausen (DE)

( * ) Notice: Subject to any disclaimer, the term of this patent is extended or adjusted under 35 U.S.C. 154(b) by 186 days.

(21) Appl. No.: 14/505,754

(22) Filed: Oct. 3, 2014

(65) Prior Publication Data

US 2016/0153751 A1 Jun. 2, 2016

(30) Foreign Application Priority Data

Oct. 5, 2013 (DE) .................. 10 2013 016 646

(51) Int. Cl.
*H01S 3/00* (2006.01)
*F41H 13/00* (2006.01)
*B64C 39/02* (2006.01)
*H04B 10/25* (2013.01)

(52) U.S. Cl.
CPC ......... *F41H 13/005* (2013.01); *B64C 39/024* (2013.01); *F41H 13/0062* (2013.01); *H04B 10/25* (2013.01); *B64C 2201/12* (2013.01)

(58) Field of Classification Search
CPC . F41H 13/005; F41H 13/0062; B64C 39/024; B64C 39/022; B64C 2201/12; H01S 3/0007; H01S 3/091
USPC ....................................................... 359/333
See application file for complete search history.

(56) References Cited

U.S. PATENT DOCUMENTS

| | | | |
|---|---|---|---|
| 6,422,506 B1* | 7/2002 | Colby | B63B 49/00 114/242 |
| 6,785,315 B1* | 8/2004 | Hook | F41H 13/0062 372/109 |
| 8,982,333 B2* | 3/2015 | Guetta | B64B 1/50 356/4.01 |
| 2012/0298839 A1* | 11/2012 | King | F41H 13/005 250/203.1 |
| 2012/0303179 A1 | 11/2012 | Schempf | |
| 2014/0183300 A1* | 7/2014 | MacCulloch | B64C 39/024 244/1 TD |

(Continued)

FOREIGN PATENT DOCUMENTS

DE 39 40 938 A1 6/1991
DE 198 08 777 A1 9/1999
(Continued)

*Primary Examiner* — Mark Hellner
(74) *Attorney, Agent, or Firm* — Crowell & Moring LLP

(57) ABSTRACT

An airborne laser weapon system is divided into a ground-based unit and an airborne unit. The relatively heavy components of the laser weapon system, such as the generator, cooling elements with cooling fluid, accumulators, pump diodes, beam couplers and the control station for an operator, are concentrated and/or arranged in the ground-based part. The relatively lightweight components and/or those that ultimately determine the quality of the laser beam, such as active laser element(s), in particular the output stage(s) thereof, the focusing drive, the telescope and the necessary sensors, may be provided on the airborne platform and may be connected by means of a relatively long, e.g. multiple kilometers, optical waveguide to the ground-based part.

11 Claims, 4 Drawing Sheets

(56) References Cited

U.S. PATENT DOCUMENTS

Figure 1:
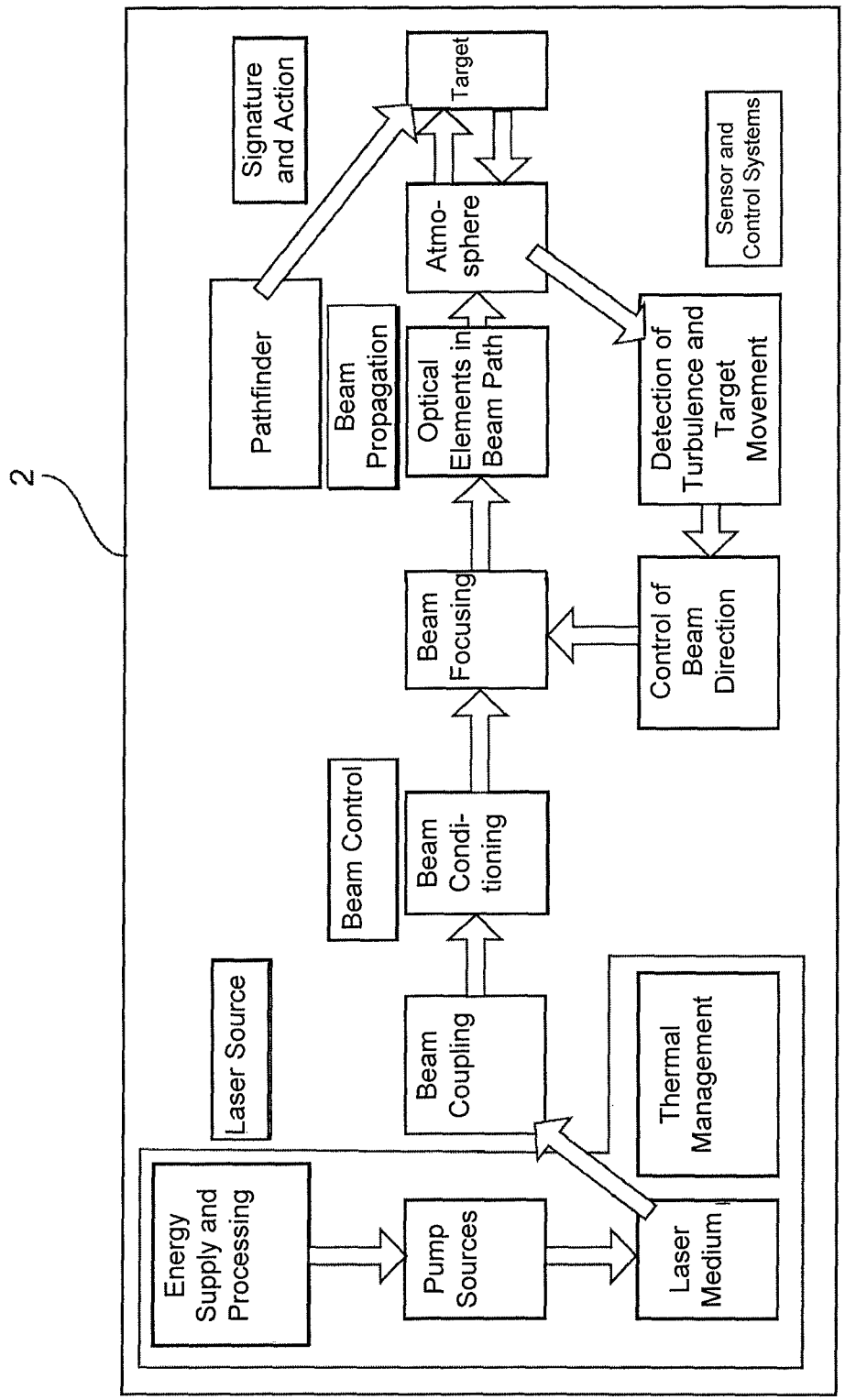

2014/0241716 A1\* 8/2014 Bradley ............. G06F 21/6209
398/39

FOREIGN PATENT DOCUMENTS

| DE | 10 2012 000 672 A1 | 4/2013 |
|----|---------------------|---------|
| EP | 2 527 779 A2 | 11/2012 |
| EP | 2 527 780 A2 | 11/2012 |

\* cited by examiner

AIRBORNE LASER WEAPON SYSTEM

CROSS-REFERENCE TO RELATED APPLICATIONS

The present application claims priority under 35 U.S.C. §119 to German patent application 10 2013 016 646.2, filed Oct. 5, 2013, the entire disclosure of which is herein expressly incorporated by reference.

BACKGROUND AND SUMMARY OF THE INVENTION

Exemplary embodiments of the present invention relate to weapons technology, particularly to an airborne laser weapon system that uses lasers pumped via optical waveguides.

Despite advances in aircraft design, conducting airborne reconnaissance or combat operations, especially at great distances from a home base, at great elevations or over extended periods of time, presents a challenge, a level of inconvenience due to the physical restrictions associated with such operations, and substantial risk to humans. This is particularly the case when the operation is itself associated with substantial hazards, e.g. it will be conducted in areas subject to enemy threats ("antiaircraft"), even up to the extreme case of a missile weapon system that is designed to deliver a warhead to a target and to self-destruct during the course of the mission. Naturally, the willingness of people to carry out such missions is somewhat limited.

In light of the above, efforts have long been underway to devise so-called unmanned aerial vehicles capable of performing such operations partially autonomously, partially remotely controlled from a base station and/or a transport means, but in any case without a crew.

Unmanned aerial vehicles (UAV) are currently known in multiple embodiments. For instance, some UAVs are designed for reconnaissance, i.e., the main purpose of such vehicles is to collect data about a situation/environment when this cannot be performed or can be performed only with difficulty from a distance, e.g. due to poor visibility or an inadequate overview of the situation. Also known are UAVs designed for warfare use, i.e. the main purpose of such vehicles is to destroy an object by delivering/administering one or more weapon systems that are carried on an aerial vehicle. (Guided) missiles represent a special embodiment of UAVs, with hybrid forms of said embodiments also being known.

Despite the extensive automation of such UAVs through advances in sensor technology, signals processing and decision making processes based on algorithms, there are still a large number of operations in which human powers of judgment cannot and should not omitted. Since a UAV carries no crew for performing such tasks, they must be performed by operators who are located, e.g., on the transport means, but in any case in a different location. To enable such operators to reach decisions and to influence the operation, data must be exchanged between the aerial vehicle and the operating unit provided for controlling the vehicle. These data are generally sensor data collected at the vehicle site/by the vehicle, which are intended to enable operators to assess the status and the situation, and control data, which are intended to enable operators to control the current and/or future behavior of the UAV, in the simplest case to guide the UAV, i.e., to influence its direction of travel in space.

Various technologies may be used for data exchange, e.g. electromagnetic radio waves in the decameter to decimeter wavelength range, which propagate in the atmosphere. However, these may be detectable and, in particular, susceptible to jamming/interference, and may have a limited range and/or a limited data rate. Also possible are electromagnetic waves in the decimeter to millimeter wavelength range; however, these are practicable only with a line of sight connection between transmitter and receiver. Another option is (laser) light propagating through the atmosphere, which is subject to essentially the same limitations as electromagnetic waves. A further option is electrical signals transmitted via lines, which may also involve risk due to the conductive connection, e.g. via high-voltage towers. Particularly preferable in the scope of the invention are optical signals transmitted via optical waveguides ("optical fiber guided"), the range of which may be limited to a certain extent, but may be greater than that of electrical lines. In this case, the exchange of data via optical waveguides can be a viable compromise that will allow particularly airborne weapon systems to be equipped with such data transmission systems. In particular, it is also possible for an airborne platform, e.g. a guided missile, flying at high speed, to tow an optical waveguide over great distances, e.g. several tens of kilometers, without the waveguide becoming detached or the transmission breaking down.

It is further possible in the field of optical waveguides (OWG), particularly optical waveguides with low damping, for large volumes of data to be reliably transmitted over many kilometers via the duplex method, so-called optical telecommunication, while at the same time transmitting high optical radiant power in the multi-kilowatt range from an optical source to a point located offset therefrom.

Applications of this type for such high-powered optical waveguides are known in the field of fiber-guided material processing systems, wherein the customary transmission paths lie within the range of several meters. The limiting factor for these transmission paths—aside from the requirements of the application—is the range of changes in beam properties that have a negative impact on the intended application, e.g. by mode coupling, dispersion and non-linear optical effects.

According to one embodiment example of the present invention, a laser weapon system is disclosed, which has at least one laser generating unit, at least one output stage element, a beam optics element, and a ground-based part and an air-based part, wherein the ground-based part is designed at least for generating energy for the laser weapon system, and the air-based part is configured for target acquisition and/or target tracking in the laser weapon system, wherein the beam optics element and the at least one output stage element are arranged on the fully movable part, characterized in that an optical fiber provides energy transmission from the ground-based part to the air-based part, and particularly provides a communications connection between ground-based part and air-based part.

According to the invention, the laser weapon system is divided into a static part, which is on a ground-based support (along with ancillary units) located on the ground, and a movable part (beam emitter) arranged on an airborne platform, wherein essentially all elements involving substantial mass and volume are preferably located in the static part, in order for the movable part that tracks the target to be as lightweight and agile as possible. The present invention therefore relates to a design for an airborne laser weapon system based on lasers pumped via optical waveguide.

This configuration is designed such that a system is produced in which the output beam, which is ultimately directed toward a target, can be focused within the fully encompassing half space, or at least in large portions thereof, wherein power is transmitted between the elements in which energy is converted from another energy form into optical radiant energy, and the final opto-mechanical element that is responsible for focusing the beam onto the target by means of fiber-optic elements. More particularly, the optical energy is not transmitted to the airborne platform via free beam guidance.

This can be accomplished by functionally dividing the beam source in such a way that, taking volume and mass into consideration, the components of the beam sources are separated into components that essentially codetermine mode quality and/or beam divergence, spectral properties and/or optical power.

In particular, an output stage that substantially determines the output beam quality, but which is responsible for only a fraction of the total volume and the total mass of a beam source may be coupled directly to a beam focusing unit, and may be situated on the airborne platform, while it continues to be supplied via fiber-optic elements with optical radiant power, which is generated in the pump sources which, together with the assigned ancillary units such as energy supply, cooling, etc., make up the majority of the total volume and the total mass of a beam source, wherein this second part may be arranged in a ground-based part of the system, and power and optical signals may be transmitted between these two parts via fiber-optic elements.

In this way, a tactical, airborne laser weapon system having relatively small dimensions, long sustainability and low costs can be provided, which is not significantly restricted in terms of its mobility and range, does not sacrifice the advantages of fiber-optic power transmission as opposed to free-beam transmission, such as robustness, reliability, independent adjustment, resistance to harsh environmental factors, flexible geometric design and low volume and mass etc., and does not require reductions in terms of mode quality and/or beam divergence, spectral properties or optical power, and therefore in the spectral radiation intensity that is available for a target, and therefore ultimately the effect that can be achieved. Moreover, operational reliability is thereby increased.

According to the invention, the beam emitter is supplied with radiant energy, i.e., the energy is transmitted from a ground-based carrier to the airborne platform by means of a towed optical waveguide. This allows optical radiant power in the high multi-kilowatt range to be transmitted over great distances of multiple kilometers. In so-called "laser drilling", laser radiation for drilling into rock, e.g. for oil and gas prospection, may be used to heat the rock that will be bored to a high temperature, in order to decrease its mechanical strength and facilitate the subsequent conveyance by means of a drill string. In this process, the radiation of the laser may be guided via optical fiber to the head of the drill string, where it is used. However, in this case particularly, so-called multimode lasers and multimode optical waveguides may be used, with brilliance and beam quality being largely lost.

In the field of laser sources, in particular in the field of electrically pumped semiconductor lasers and/or diode lasers, solid-state laser sources and/or fiber lasers and the associated optics systems, it may be possible to generate, handle and focus optical power in the range of several kilowatts up to 100 kW or more with a high degree of efficiency, e.g., electrically/optically 25% or more. Such semiconductor and/or solid-state laser sources of maximum power and efficiency can preferably operate in the near infrared range (wavelength of approximately 800 nm to approximately 1.5 μm).

According to the invention, laser weapon systems based on high-powered lasers may be used against various classes of targets, for self-defense of platforms or for offensive missions. This includes missions against static targets, e.g. mines, barricades, fortifications and the like, but also against dynamic targets, e.g. as part of a defense against threats by flying objects (RAM—rocket, artillery, mortar), guided missiles with or without seeker heads, drones, UAVs, but also vehicles, weapon systems, radar systems, etc. To effectively oppose such targets, optical radiant power ranging from 10-100 kW or more may be provided. In this connection, it is in the general nature of a threat to arise without forewarning and from a previously unspecified direction, and to necessitate defensive action within periods of fractions of seconds up to several seconds.

It may therefore be necessary for an operational laser weapon system to be designed to enable operations against targets, and therefore to enable a beam focusing of the laser beam emitted by the system to be carried out with high spatial dynamics and precision. Typical acceptable values for focusing speeds and focusing accelerations are, e.g., 1 rad/s and 1 rad/s$^2$, with a simultaneous final focusing precision of the emitted laser beam of 5 μrad. For such applications, the presence of large movable masses is avoided according to the invention.

To this extent, achieving suitable efficacy of a beam weapon system—in particular, a laser weapon system—against an object requires that the object—from the viewpoint of the system executing the effect—is located in the field of view of the system. Due to this specific precondition, which is determined by the substantially rectilinear propagation of the provided electromagnetic, optical or quasi-optical radiation, an object that is concealed, e.g., behind a geographic elevation, such as a mountain, or behind a house or a vehicle, cannot be easily impacted from a location near the ground. Notwithstanding the technical preconditions for implementation which are necessary when beam-type weapons are deployed over great distances due to the impact of the atmosphere on the radiation, the use of such systems on targets that are located beyond the horizon is possible only with great difficulty.

According to the invention, an action against a target object Z is not achieved directly from the location of the system that carries out the action; instead, an additional station is used as a relay point. In the concept of such a system, first an active laser beam of suitable power and other beam properties is generated by a base station B, and is then directed to a relay unit R located on an airborne platform and from this is either directed by passive deflection by means of a reflector to the target object, or is first received by a beam receiver, e.g. a receiving telescope, then focused and mode adjusted, in order to then be focused, following a suitable change in direction by a beam emitter, e.g. an emitting telescope, onto the target. In either case, it may be necessary for the relay station to be located on the airborne platform within the field of view of the base station, and for the target to be located within the field of view of the relay station on the airborne platform.

Both may be regularly ensured when the distance between the individual stations is not too great and the relay station is located at a sufficient elevation above the base line between the two other points B and Z, with the situation becoming more favorable as the elevation increases. However, at a great elevation, the resulting beam path as a whole along the distance from B to R to Z becomes increasingly larger. In contrast, a low elevation causes the angle of deflection between B to R and R to Z to become very shallow, making a passive deflection unfavorable due to the resulting sweeping incidence on the reflector. It is further noted that installing a high-powered laser on the ground and transmitting the generated laser radiation to the relay station via a free beam that is directed above the horizon is associated with certain safety risks. For instance, a beam that is not fully captured by the relay platform due to an error will continue to propagate in the original direction nearly without limits, and without substantial influence in terms of intensity, and will pass through the atmosphere and into space. There, it may present a hazard to air traffic and to satellites in perigee.

Another possible method for attacking a (ground) target from the air involves installing the entire laser system on board an airborne platform. For example, a high-powered laser of the 100 kW class, e.g. a chemical laser—COIL, may be installed on board a transport aircraft, and its generated radiation may be focused on a target by means of a beam focusing unit that projects out of the fuselage of the aircraft.

Regardless of the embodiment type of the actual laser-active medium (rod-, slab-, fiber- or disk laser) of a laser source, such a system can be implemented using a so-called diode pumped laser, e.g. designed as a solid-state laser, wherein liquid-, gas-, or metal vapor lasers may also be used, i.e., the primary energy in the form of electrical energy may be converted to radiant energy for the optical excitation of the laser-active medium using a (large) number of semiconductor lasers, diode lasers. A direct use of the radiation emitted by the semiconductor lasers may also be conceivable. In this case, the level of efficiency for the conversion of electrical energy to radiant energy for optical excitation, and for the conversion of this radiant energy for optical excitation to the optical output power of the laser system may be less than one due to the laws of physics. In general, efficiency levels of approximately 50% can be achieved for both processes, so that the total efficiency of the conversion of electrical energy to radiant energy of a laser, frequently referred to as the socket efficiency, can range from 25-50%, depending upon the type of embodiment. Additional optical losses may occur in the transmission of the radiant energy and electrical losses may occur in lines and in electronic circuits that are routinely used for the controlled manipulation of the semiconductor laser and for energy conversion.

According to the invention, in addition to these pump elements and the laser medium, a further plurality of functional elements, such as power supply, buffering, cooling, mechanical structure, optical elements, sensors and actuators, etc. are required for a functional laser weapon system.

The concept of the invention is characterized in that an airborne laser weapon system is produced in which all of the laser sources of the laser weapon system, or at least the parts thereof that are particularly bulky or heavy, such as pump sources, energy supply and storage, cooling, etc., together with the beam focusing unit, do not need to be carried along with the beam focusing unit on board the airborne platform. Moreover, the available operating duration is no longer subject to the narrow limits of an airborne platform when the energy supply is also carried along, and it is no longer necessary to guide a high-powered free beam that is subject to strict precision requirements through the atmosphere between two objects (ground station, relay) that are moving relative to one another and to a stationary reference system (ground), or to account for the fact that the fiber length that is required for beam transmission of the output power of the laser system with a towed fiber optic guide will negatively impact the properties of the beam. Moreover, the risk that is associated with a high-powered laser beam being emitted into open air space in the direction of the relay platform is naturally also eliminated. The solution according to the invention also results in a system with increased reliability and readiness for use, since the design of the system decreases the number of elements that are located on board the airborne platform and are subject there to the particular stresses of air transport, and is limited substantially to monolithic fiber elements.

BRIEF DESCRIPTION OF THE DRAWING FIGURES

Figure 2:
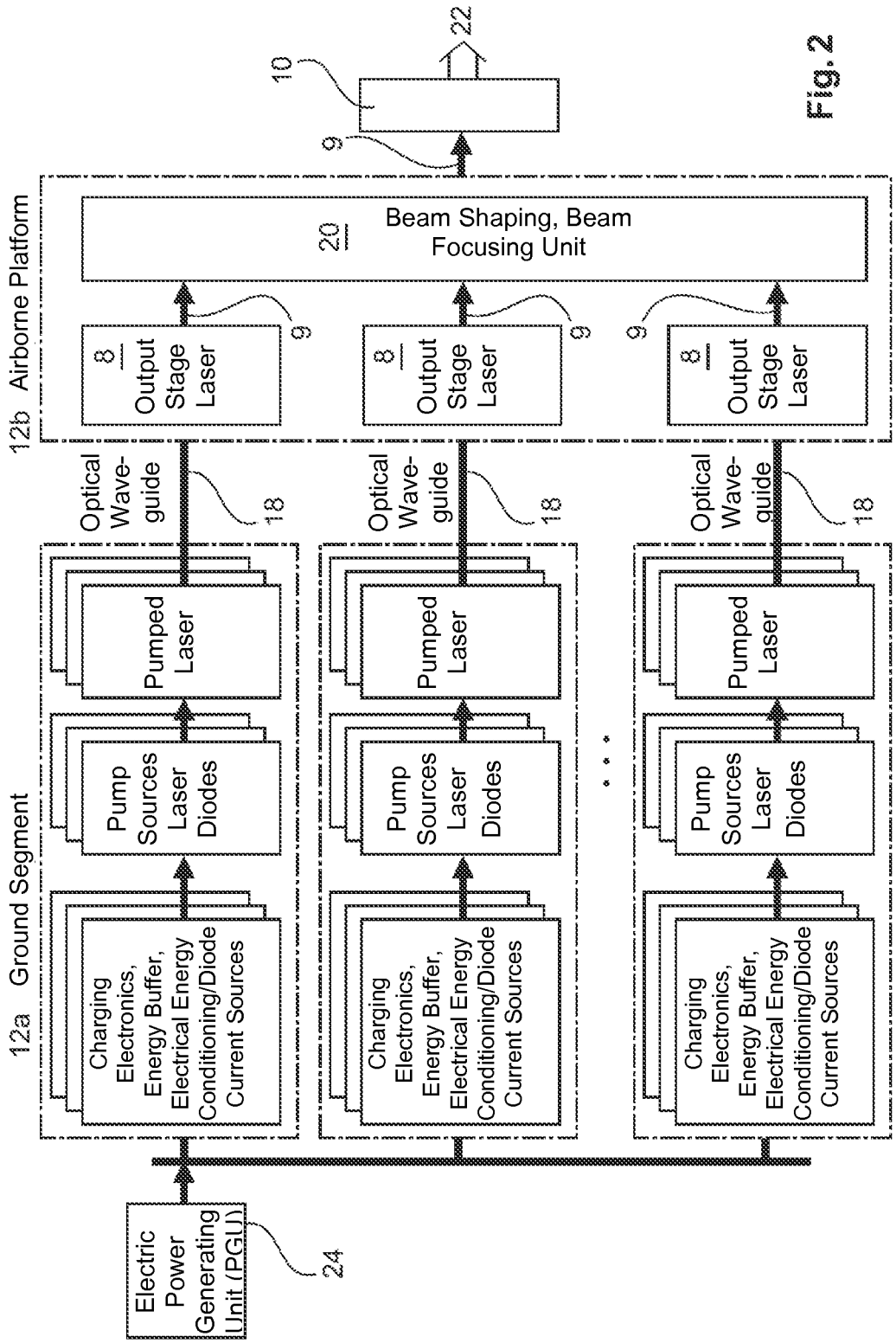
Figure 3:
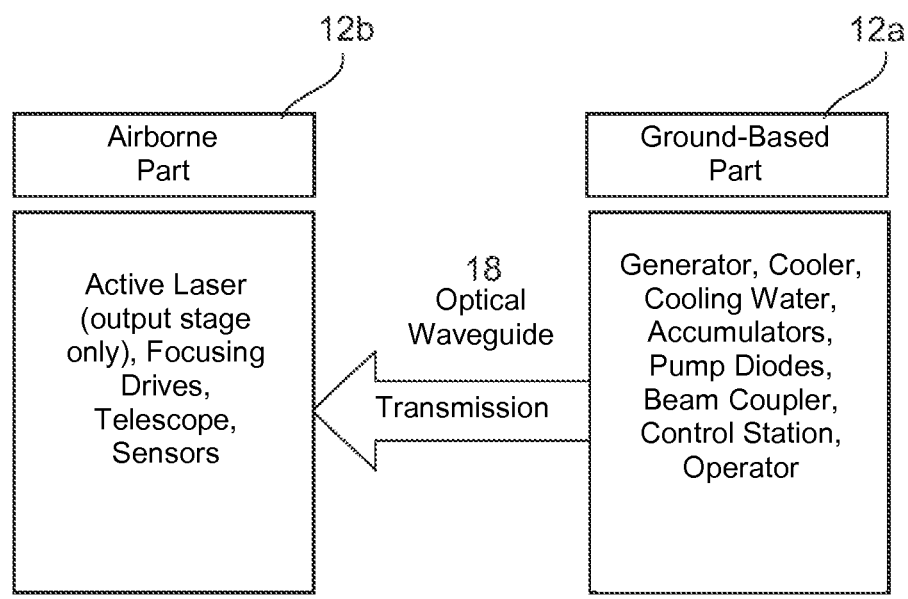
Figure 4:
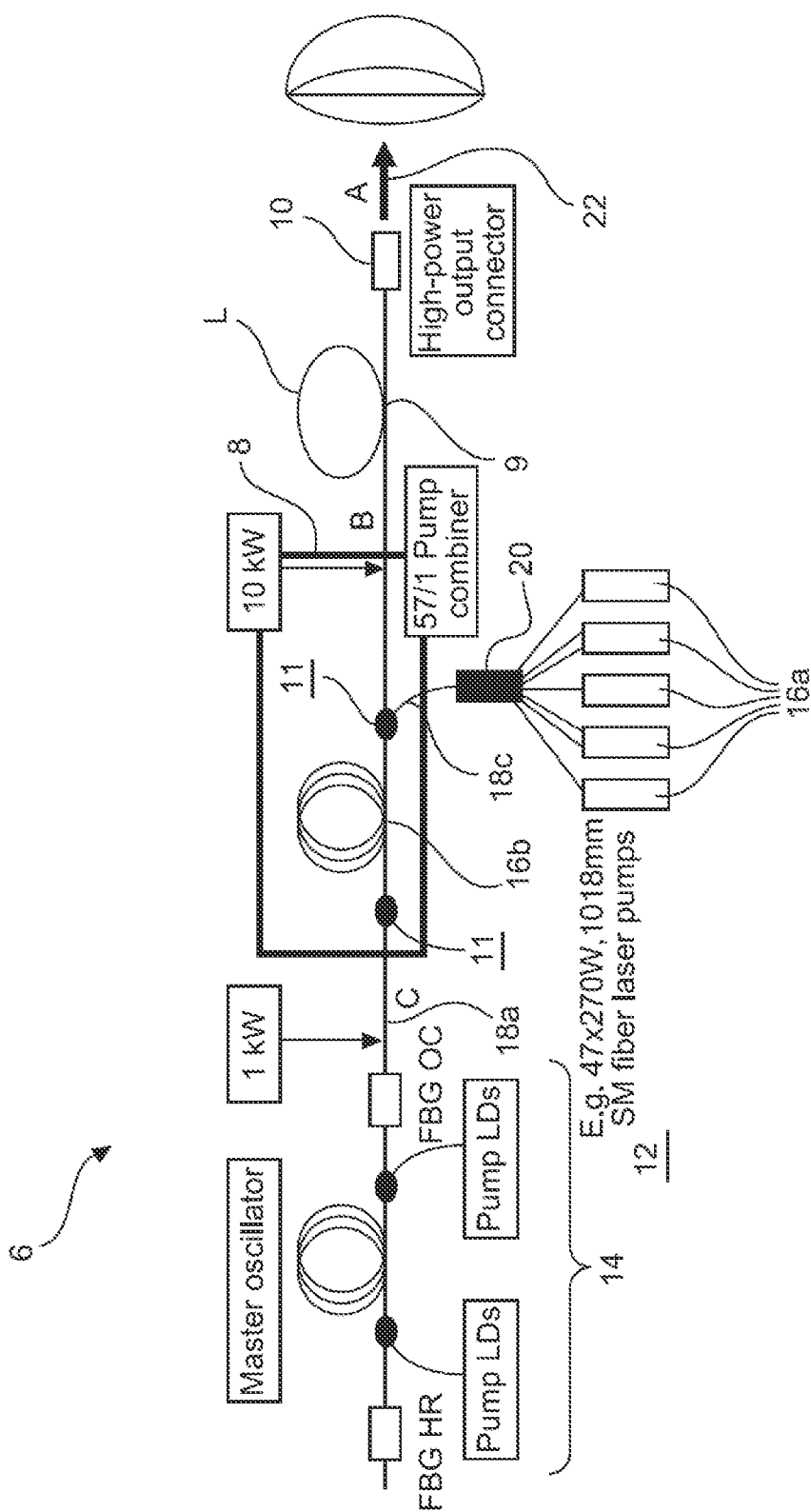

In the following, embodiment examples of the invention will be specified in greater detail with reference to the attached set of drawings. The drawings show:

FIG. 1 an embodiment example of a global generic configuration of the functional components of a laser weapon system;

FIGS. 2 and 3 an embodiment example of a distribution of the functional components according to the present invention; and FIG. 4 an embodiment example of a fiber laser configuration according to the present invention.

DETAILED DESCRIPTION

In further reference to FIG. 1, a global generic configuration of the functional components of a laser weapon system is illustrated.

In this case, an energy supply and processing system acts on the pump sources, which use the laser medium to generate an active beam, which is then fed into the beam control unit. The beam control unit consists, for example, of beam coupling(-in) followed by beam conditioning and elements that enable alignment of the beam, for example, onto a target. The active beam then propagates over possible optical elements in the beam path and generally through the earth's atmosphere in the direction of the target, which can be marked by a pathfinder. An action by the beam is produced on the target. Sensor systems and electronic control systems can, e.g., detect turbulence in the atmosphere and movements of the target, and can reposition and/or redirect the active beam using a suitable control system.

This plurality of functional elements and the ancillary devices required for operating them gives the system as a whole substantial mass and substantial volume, which can easily amount to several tons in a system in the 100 kW power class. According to the literature, power-to-mass ratios of 50 kg/kW cannot be realistically undercut substantially. It is therefore clear that the airborne platforms that are suitable for installation of such a laser system and are used as supports for such a device are subject to certain restrictions in terms of minimum possible size.

Electrochemical energy storage units, in particular, have substantial additional space requirements and additional mass, resulting in substantial limitations in terms of a limited period of use, given a preset total mass and/or predefined installation space of a potential support platform. Furthermore, during operation of such an airborne laser weapon system, once the existing electrical energy store has been depleted and the system has been returned to a supply base at the end of such a mission, where applicable, a certain amount of time is required to prepare the system for its next use, e.g. charging or replacing the energy store. This severely limits the availability of such a system.

Electrical energy in this system can be stored, in principle, e.g. by means of flywheel storage devices, electrochemical accumulators or high-capacity capacitors, so-called supercaps. In systems of this type, gravimetric storage densities of 100 Wh/kg, corresponding to 360 kJ/kg, to a potential maximum of 500-1000 Wh/kg, corresponding to 1800-3600 kJ/kg, can be achieved in the best possible case. In principle, it should be noted that action against a target by means of laser radiation from the air is preferable to action from the ground, since the interference by the atmosphere in the form of turbulence or scattering on aerosols of the beam is thereby decreased. This is because the accumulated influence of the first section of the beam path is most important for the overall result, and both the influence of turbulence and the aerosol concentration decrease rapidly as elevation increases.

The principle of a division of the functional components according to the invention is illustrated in FIGS. 2 and 3.

FIG. 2 shows a plurality of laser weapon systems interconnected by way of example for the purpose of increasing energy. These systems are connected to a common power supply 24, but are otherwise independent units. The individual laser generating units are in turn connected to output stage elements 8 using optical fibers 18, in particular, an individual optical fiber 18. This totality of the output stage elements 8 is arranged on the airborne part 12*b*. Each of the output stage elements 8 is connected to an (additional) beam coupling unit 20 using an optical fiber 9 or an optical free beam 9. The individual beam portions of the individual output stage elements 8 are then combined in the beam coupling unit 20 and are forwarded via an optical fiber 9 or an additional optical free beam 9 to a beam optics element 10 for emitting the active beam 22. One embodiment of FIG. 2 shows, in particular, a scalable system, since a desired and/or required output power can be achieved through a corresponding adjustment of the number of individual modules.

FIG. 3 shows an example of a division of the components of an airborne laser weapon system according to the invention into the ground-based part 12*a* and the airborne part 12*b*. In particular, the relatively heavy components of the laser weapon system, such as the generator, cooling elements with cooling fluid, accumulators, pump diodes, beam couplers and the control station for an operator are concentrated and/or arranged in the ground-based part 12*a*. The relatively lightweight components and/or those that are ultimately necessary for the quality of the laser beam, such as active laser element(s), in particular the output stage(s) thereof, the focusing drive, the telescope, and the necessary sensors can be provided on the airborne platform 12*b* and can be attached by means of a relatively long, e.g. several kilometers, optical waveguide 18 to the ground-based part 12*a*. The optical waveguide 18 in this case transmits energy from the ground platform 12*a* to the air platform 12*b* and transmits command and control data between base platform 12*a* and air platform 12*b*. Those components that are responsible for the ultimate beam quality are preferably provided on the air platform 12*b*.

However, in the end, the suitability of a laser source that is suitable for a laser weapon system is determined substantially by the mode quality and/or beam divergence, the spectral properties and the optical power thereof. For this reason, in this connection, with 10 kW optical power, for example, the freely available fiber length is currently less than 2.5 m. It would appear to be difficult to implement a concept for beam transmission according to the concept of an optical waveguide of such short free length that is towed behind an airborne platform.

To avoid the problems presented above, it is proposed to design the structure of a laser weapon system such that only one output stage, which is at the end of the amplification chain of a laser source and ultimately determines the mode quality and/or beam divergence, spectral properties and optical power of the radiation emitted by the laser source, optionally an oscillator which likewise determines the beam properties, and an assigned beam focusing system, which focuses the laser beam that has been generated in this manner onto a target, is arranged offset from the remaining components of the laser weapon system, particularly from the diode pump sources, the ancillary units and the energy storage devices, on the airborne platform that belongs to this weapon system.

With an unmanned airborne platform, the assigned support generally involves a ground-based platform, regardless of whether it is a platform that is located or anchored on land or a vehicle. However, this naturally also does not exclude the possibility of the support being a watercraft, ship or submarine. The output stage described can particularly be a fiber laser, wherein the output stage either again ends in a fiber output of short length or ultimately a free beam is emitted therefrom. However, it is also conceivable for the described output stage to involve a different type of optically pumped laser source, in which the medium is designed as a rod-, slab- or disk laser, or as a number or combination of such geometries, wherein in this case, a free beam is preferably likewise ultimately emitted. In any case, the actual high-powered, high-quality beam that is required for the operation is first generated on board the airborne platform.

It is not absolutely essential for the output stage to contribute substantially to the optical output power of the laser source, that is, to have a power amplification of significantly greater than 1. Rather, an output stage is also conceivable which largely passively compensates for only the deterioration of beam properties in terms of mode quality and/or beam divergence or the spectral or time-dependent properties of the beam which are caused/occur during transmission from the stages upstream.

It is further noted that the concept is not necessarily limited to the use of a beam source or pump source, and can instead also be transferred to the principle of beam coupling of a plurality of laser sources or pump sources. In this case, a plurality of output stages or a plurality of pump sources are used, which are connected in an equivalent manner via (a plurality of) optical waveguides to the airborne platform.

Applied to a current fiber laser design, an embodiment example is shown in FIG. 4, which can be designed such that the above-described output stage consists of the specified active fiber, with the interfaces consisting of the points specified as B, C and D, which are also characterized in that, in contrast to a classic concept in which the interface consists of the point identified as A, the interfaces are not simultaneously subject to high powers and stringent requirements in terms of transmission behavior. In the present case, an optical waveguide of suitable design and suitable length, e.g. multiple kilometers, may be spliced in at point D, and the base connected to the aerial vehicle in order to reach the intended goal.

FIG. 4 shows the schematic structure of active beam generation of a beam focusing unit 4 according to the invention. A seed laser unit 14, which is substantially known from the prior art, has two pump laser diodes in FIG. 4, by way of example, and generates with the active fiber and/or the master oscillator a laser beam with the input power for the fiber amplifier downstream and/or an optically pumped fiber 16b. Arranged upstream and downstream of the active fiber of the seed laser unit 14 are fiber Bragg gratings as wavelength-selective fiber reflectors of the fiber-coupled pump laser diodes.

Seed laser unit 14 has, by way of example, an output of 1 kW, and is coupled to the output stage element 8 by means of an optical fiber 18a. Pump laser units 16a are connected to a beam coupler unit 20 by means of optical fibers 18b, and said coupler unit is in turn connected via optical fibers 18c to the output stage element 8. The beam coupler unit 20 can be part of the output stage element 8, or alternatively can at least be arranged on the fully movable part 12b. Therefore, the optical fibers 18a,b or 18a,c can provide the transition between the stationary/partially movable part 12a and the fully movable part 12b.

FIG. 4 shows various coupling points 11 for the pump laser units 16a and/or the beam coupler unit 20 in the output stage element 8, in particular, upstream and downstream of the fiber amplification unit 16b.

The active beam in the optical fiber 18 within the output stage element 8 is then transmitted by means of an optical fiber 9 or an optical free beam 9 to a beam optics element 10, which is capable of emitting the active beam 22 in a focused or targeted manner, in particular, in a half-space, dependent on the embodiment of the fully movable part of the beam focusing unit 4. The active beam 22 can therefore be directed toward a target, where it can achieve a required and/or desired effect.

It is further noted that "having" or "comprising" does not exclude any other elements or steps, and that "a" or "an" does not exclude a plurality. It is further noted that features or steps that have been described with reference to any of the above embodiment examples may also be used in combination with other features or steps of other above-described embodiment examples. Reference signs in the claims are not considered to have a limiting effect.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

2 Laser weapon system
6 Laser generating unit
8 Output stage element
9 Optical fiber/optical free beam
10 Beam optics element
12a Ground-based part
12b Airborne part
14 Seed laser unit
16a Pump laser unit
16b Fiber amplifier unit
18a,b,c Optical fiber
20 Beam coupler unit
22 Active beam
24 Energy supply

What is claimed is:

1. A laser weapon system, comprising:
   at least one laser generating unit;
   at least one output stage element;
   a beam optics element;
   a ground-based part; and
   an air-based, fully moveable part;
   wherein the ground-based part is configured at least to generate energy for the laser weapon system,
   wherein the air-based part is configured to acquire a target for the laser weapon system,
   wherein the beam optics element and the at least one output stage element are arranged on the air-based, fully movable part,
   wherein an optical fiber is configured to transmit energy from the ground-based part to the air-based part and convey communications between the ground-based part and the air-based part.

2. The laser weapon system of claim 1, wherein the at least one output stage element is configured to perform at least one function from the group consisting of
   amplifying optical output power,
   conditioning an output beam, and
   compensating and/or improving mode quality, beam divergence, and spectral and/or time-dependent properties of the output beam.

3. The laser weapon system of claim 1, wherein the at least one laser generating unit is a fiber laser.

4. The laser weapon system of claim 1, wherein the at least one laser generating unit comprises:
   at least one seed laser unit;
   at least one pump laser unit; or
   at least one fiber amplifying unit,
   wherein the laser generating unit is connected to the output stage element by an optical fiber.

5. The laser weapon system of claim 1, wherein the at least one output stage element comprises:
   a fiber amplifying unit,
   wherein a seed laser unit and at least one pump laser unit is connected to the at least one output stage element by at least one optical fiber.

6. The laser weapon system of claim 1, further comprising:
   a plurality of pump laser units connected to a beam coupler unit, wherein the beam coupler unit is connected to the at least one output stage element.

7. The laser weapon system of claim 1, further comprising:
   a plurality of pump laser units connected to the at least one output stage element, wherein the at least one output stage element has a beam coupler unit.

8. The laser weapon system of claim 1, wherein
   the laser weapon system is configured to align an active beam within a half-space; or dynamic properties of the air-based, fully movable part of the beam optics element have
   a focusing speed of >0.1 rad/s,
   a focusing acceleration of >0.1 rad/s$^2$, and/or
   a focusing precision of <20 μrad.

9. The laser weapon system of claim 8, wherein
   the focusing speed is 2 rad/s,
   the focusing acceleration is 2 rad/s$^2$, and/or
   the focusing precision is <2 μrad.

10. The laser weapon system of claim 1, wherein a connection between output stage element and beam optics element is achieved by an optical fiber or an optical free beam, wherein length of the optical fiber or of the optical free beam is <2.5 m.

11. The laser weapon system of claim 1, wherein the optical fiber has a length of up to 8 km.

* * * * *